United States Patent
Tomita

(10) Patent No.: US 7,415,650 B2
(45) Date of Patent: *Aug. 19, 2008

(54) INFORMATION RECORDING/REPRODUCING APPARATUS, AND INFORMATION RECORDING MEDIUM

(75) Inventor: Yoshimi Tomita, Tsurugashima (JP)

(73) Assignee: Pioneer Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/783,523

(22) Filed: Apr. 10, 2007

(65) Prior Publication Data

US 2007/0288826 A1 Dec. 13, 2007

Related U.S. Application Data

(63) Continuation of application No. 10/433,565, filed as application No. PCT/JP01/11391 on Dec. 25, 2001, now Pat. No. 7,266,753.

(30) Foreign Application Priority Data

Dec. 26, 2000 (JP) .......................... P2000-396207
Feb. 28, 2001 (JP) ............................ P2001-55586

(51) Int. Cl.
*H03M 13/00* (2006.01)
(52) U.S. Cl. ...................... 714/752; 714/786
(58) Field of Classification Search ................ 714/752, 714/775, 758, 786
See application file for complete search history.

(56) References Cited

U.S. PATENT DOCUMENTS

| | | | |
|---|---|---|---|
| 5,187,699 A | 2/1993 | Raaymakers et al. | |
| 5,222,086 A | 6/1993 | Fujita | |
| 5,577,013 A | 11/1996 | Kobunaya | |
| 5,835,478 A | 11/1998 | Kobayashi et al. | |
| 5,841,748 A * | 11/1998 | Yamamuro | 369/47.14 |
| 5,886,985 A * | 3/1999 | Kobayashi et al. | 369/275.3 |
| 6,067,281 A | 5/2000 | Kobayashi et al. | |
| 6,115,340 A | 9/2000 | Van Den Enden et al. | |
| 6,147,945 A | 11/2000 | Kobayashi et al. | |
| 6,252,838 B1 * | 6/2001 | Kuroda et al. | 369/47.28 |
| 6,967,909 B2 | 11/2005 | Van Den Enden et al. | |
| 2007/0288804 A1 | 12/2007 | Tomita | |

FOREIGN PATENT DOCUMENTS

| | | |
|---|---|---|
| EP | 0 251 277 | 1/1988 |
| EP | 0 613 136 | 8/1994 |
| EP | 0 813 198 | 12/1997 |

(Continued)

*Primary Examiner*—Guy J Lamarre
*Assistant Examiner*—Esaw Abraham
(74) *Attorney, Agent, or Firm*—Drinker Biddle & Reath LLP

(57) ABSTRACT

In an information recording, a first data processor divides input data into a plurality of frames so as to arrange the plurality of frames for each unit block. The unit block is a unit of error-correction with respect to the input data and the frames include first identification information, respectively. A second data processor inserts a linking block on a boundary portion between unit blocks in the record data. The unit blocks are adjacent to each other. The linking block includes a second identification information and the second identification information is different from each of the first identification information. A controller controls to record the unit block and the linking block on the information recording medium.

4 Claims, 14 Drawing Sheets

FOREIGN PATENT DOCUMENTS

| | | |
|---|---|---|
| EP | 0 893 794 | 1/1999 |
| EP | 0 991 061 | 4/2000 |
| EP | 1 045 391 A | 10/2000 |
| JP | 61-139984 | 6/1986 |
| KR | 1998-703893 | 12/1998 |
| WO | WO 97/30439 | 8/1997 |

* cited by examiner

INFORMATION RECORDING/REPRODUCING APPARATUS, AND INFORMATION RECORDING MEDIUM

This is a continuation application of application Ser. No. 10/433,565, having a § 371 date of Jun. 5, 2003 now U.S. Pat. No. 7,266,753, which is a national stage filing based on PCT International Application No. PCT/JP01/11391, filed on Dec. 25, 2001. The copending application Ser. No. 10/433,565 is incorporated by reference herein in its entirety.

TECHNICAL FIELD

The present invention relates to an information recording/reproducing apparatus and an information recording method each of which is capable of inserting a linking block on an information recording medium which allows information to be recorded thereon or to be reproduced therefrom, an information recording medium on which the linking block is inserted and an information reproducing apparatus for reproducing information recorded on an information recording medium.

BACKGROUND, ART

Large-capacity information recording mediums, such as DVDs (Digital Versatile Disc) which are typical of them, have been widely spread. In recently, the desire with respect to an information recording medium which allows data to be recorded thereon grows. For example, standards of disks including a DVD-R (DVD-Recordable) which allows data to be recorded thereon only once, a DVD-RW (DVD-Re-Recordable) which allows data to be repeatedly recorded thereon and so on are known. In cases of recording data on such as recordable or re-recordable disk, when recording additional data on an area which is continued on a former area on which another data is already recorded, a linking block must be formed on the boundary portion between both of data.

That is, when starting to record new additional data on an area directly adjacent to the former area on which data is already recorded, a difference between both of the timings of reproducing both of the adjacent areas causes a data error.

Recording, therefore, new additional data on another area away from the former area on which the data is already recorded at a predetermined interval makes secure accurate reproduction of the recorded data.

In a DVD format, error-correction operations are carried out for each ECC (Error Control Code) block. After new additional data is recorded on the DVD, the last ECC block included in the already recorded data and the first ECC block included in the new additional data are adjacent to each other. Usually, a predetermined range in the first ECC block, which is adjacent to the head thereof, is set as the linking block.

Setting the linking block, however, in the described manner causes a problem in that a size of the ECC block, which can be utilized for error-correction, to be reduced, thereby deteriorating error-correction performance.

In order to prevent the error-correction performance from being deteriorated, it is possible not to write data on the head one of the ECC blocks in the additional data, data which must be originally written thereon. Because the ECC block, however, has a remarkably large data size (16 sectors in length, that is, 38688 bytes in length), in cases where the head one of the ECC blocks is not utilized each time the additional data is recorded, making increase useless areas in the recording zone on the disk, thereby causing a data capacity of the disk which allows recording of data thereon to be decreased.

From this viewpoint, it is considered that the linking block is arranged independent of the ECC block, whereas, when forming the linking block on a recordable/re-recordable information recording medium, such as a DVD-R, DVD-RW or the like, which allows data to be recorded, so that the linking block is independent of the ECC block, it is not secured that the compatibility of the recordable/re-recordable information recording medium with a reproduction-only information recording medium such as DVD-ROM (DVD-Read Only Memory).

It is, therefore, desirable to determine the format of linking block which is commonly arranged on both of the recordable/re-recordable information recording medium and the reproduction-only information recording medium, thereby making common the definition of the format of linking block as a recording format.

The linking block, however, in the reproduction-only information recording medium, which is not originally required therein, causes the recording capacity of the reproduction-only information recording medium to be wasted.

In cases where the recording format is common between the recordable/re-recordable information recording medium and the reproduction-only information recording medium so that arbitrary information is recorded on the linking block in the reproduction-only information recording medium, it is impossible to prevent the whole information recorded on the reproduction-only information recording medium from being illegally copied, thereby recording the illegally copied information on the recordable/re-recordable information recording medium.

The present invention is directed to overcome the foregoing problems. Accordingly, it is an object of the present invention to provide an information recording/reproducing apparatus, an information recording medium, an information reproducing medium and so on, which are capable of preventing, when forming the linking block on an information recordable/re-recordable recording medium or a reproduction-only information recording medium, error-correction performance from being deteriorated, thereby improving their reliabilities.

In addition, it is another object of the present invention to cause the waste in a recording area of an information recording medium to be decreased, thereby making efficiently use of the recording capacity in the information recording medium. Furthermore, it is further object of the present invention to efficiently prevent an illegal copy from the information recording medium.

SUMMARY OF THE INVENTION

According to one aspect of the present invention, there is provided an information recording apparatus for recording information comprising: a first data processor for dividing input data into a plurality of frames so as to arrange the plurality of frames for each unit block, the unit block being a unit of error-correction with respect to the input data, the frames including first identification information, respectively; a second data processor for inserting a linking block on a boundary portion between at least one pair of unit blocks, at least one pair of the units blocks being adjacent to each other, the linking block including second identification information, the second identification information being different from each of the first identification information; and a controller for controlling to record the unit block and the linking block on the information recording medium.

According to another aspect of the present invention, there is provided a method of recording record data on an information recording apparatus comprising: dividing input data into a plurality of frames so as to arrange the plurality of frames for each unit block, the unit block being a unit of error-correction with respect to the input data, the frames including first identification information, respectively; inserting a linking block on a boundary portion between at least one pair of unit blocks, at least one pair of the units blocks being adjacent to each other, the linking block including second identification information, the second identification information being different from each of the first identification information; and controlling to record the unit block and the linking block on the information recording medium.

According to further aspect of the present invention, there is provided an information recording medium on which record data is previously recorded, comprising: a recording area on which a plurality of frames are arranged for each unit block, the record data being divided into the plurality of frames to which first identification information is added, respectively, the unit block being a unit of error-correction with respect to the record data; and a linking block inserted on a boundary portion between at least one pair of unit blocks in the record data, at least one pair of the units blocks being adjacent to each other, the linking block including second identification information, the second identification information being different from each of the first identification information.

According to still further aspect of the present invention, there is provided an information reproducing apparatus for reproducing record data which is recorded on the information recording medium according to claim 17, comprising: a fourth data processor for reproducing, as reproduction data, the record data recorded on the image recording medium; and a fifth data processor for detecting the second identification information from the reproduction data, thereby identifying a position of the linking block.

According to still further aspect of the present invention, there is provided an information recording medium for recording thereon record data, in which the record data comprises a plurality of unit blocks and a plurality of linking information, the unit block being a unit of error-correction with respect to the record data, each of the linking information connecting each pair of unit blocks adjacent to each other, the information recording medium comprising: first areas previously storing thereon recording position information representing recording positions on the information recording medium, respectively; and second areas each of which is N times as wide as each of the first recording areas, the N being a natural number, wherein each of the recording position information represents that each of the unit blocks and each of the linking information corresponding thereto ought to be recorded on each of the second areas.

According to still further aspect of the present invention, there is provided a method of preventing an illegal copy in accordance with a recording format for recording record data for each unit block, the unit block being a unit of error-collection with respect to the record data, the method of comprising: forming a linking block on a boundary portion between at least one pair of the unit blocks according to the recording format, at least one pair of the units blocks being adjacent to each other; arranging an emboss area on a recording track on an information recording medium, the emboss area being composed of an emboss pit line, the emboss area being overlapped on the emboss area, thereby preventing recording in the emboss area; and recording control information on the linking block on a reproduction-only information recording medium, the reproduction-only information recording medium corresponding to the recording format, the control information being required for reproduction operation.

BRIEF DESCRIPTION OF THE DRAWINGS

Other objects and aspects of the present invention will become apparent from the following description of an embodiment with reference to the accompanying drawings in which.

DETAILED DESCRIPTION OF PREFERRED EMBODIMENT

Preferred embodiments of the present invention will be described hereinafter with reference to the accompanying drawings.

Figure 1:
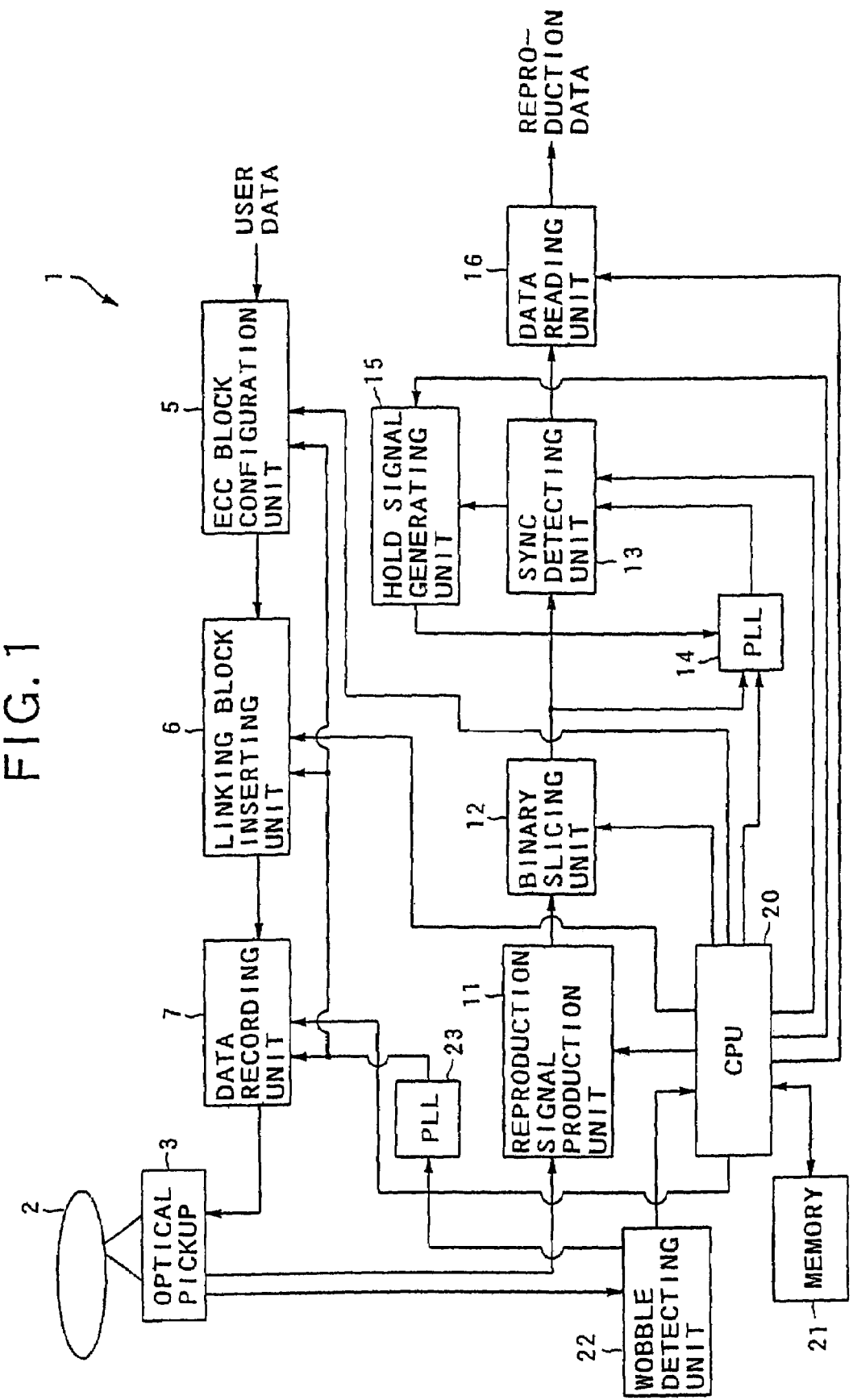
FIG. 1 is a block diagram showing a schematic structure of an information recording/reproducing apparatus related to a first embodiment of the present invention.

FIG. 1 is a block diagram showing a schematic structure of an information recording/reproducing apparatus 1 related to a first embodiment of the present invention.

Incidentally, in the first embodiment, the information recording/reproducing apparatus 1, which is capable of performing recording/reproducing operations with using an information recording medium on which digital data can be recorded according to a DVD format, and to which the present invention is applied, is explained hereinafter.

According to the first embodiment, when recording data on a disk as the information recording medium, such as a DVD-RW, DVD-R or the like, the linking block is formed so that, when recording additional data continuously to the already recorded data, the additional data is recorded so that a linking block is interposed on the boundary portion between the already recorded data and the additional data.

The configuration of the linking block formed on the disk is different from that of the conventional linking block.

That is, as shown in FIG. 1, the information recording/reproducing apparatus 1 comprises an optical pickup 3 having a light source such as a semiconductor laser for recording data on a disk 2, such as the DVD-RW, DVD-R or the like, and for reproducing it thereon.

The information recording/reproducing apparatus 1 also comprises an ECC block configuration unit 5 for converting an analog signal corresponding to information to be recorded, which is inputted from an outside (for example, information, such as image information, sound information, image-analog mixed information or the like, which is inputted by a user using the information recording/reproducing apparatus 1, referred to as "user information", hereinafter) into digital user data.

The ECC block configuration unit 5 is also operative to execute a coding operation including an error-correction processing on the basis of the digital user data so as to configure ECC blocks.

The information recording/reproducing apparatus 1 comprises a linking block inserting unit 6 for inserting a linking block on the digital user data (record data) which is configured as the ECC blocks by the ECC block configuration unit 5, and a data recording unit 7 for recording through the optical pickup 3 the record data on which the linking block is inserted on the disk 2 as pits corresponding to the information to be recorded.

The information recording/reproducing apparatus 1 comprises a wobble detecting unit 22 for detecting, when recording the record data corresponding to the information to be recorded on the optical disk 2 on which no data is recorded, an wobbling detection signal corresponding to wobbling of a recording track of the unrecorded optical disk 2 according to reflected beam from the recording track thereof. The wobble detecting unit 22 is also operative to output the wobbling detection signal to a CPU 20 and a PLL (Phase Locked Loop) unit 23, respectively. Incidentally, the PLL unit is referred to as simply PLL.

The information recording/reproducing apparatus 1 comprises the PLL 23 for generating a record clock signal according to the wobbling detection signal, record clock signal that is a reference signal by which the data recording unit 7, the linking block inserting unit 6 and the ECC block configuration unit 5 are operated. The PLL 23 is also adapted to supply the record clock signal to the data recording unit 7, the linking block inserting unit 6 and the ECC block configuration unit 5, respectively.

The information recording/reproducing apparatus 1 comprises the CPU 20 for detecting address information stored on the unrecorded optical disk 2 according to the wobbling detection signal in the manner described hereinafter, thereby outputting the address information to the data recording unit 7.

That is, the disk 2 is rotated with a rotating drive unit (not shown).

The optical pickup 3 receives the record data transmitted from the data recording unit 7 and drive the light source on the basis of the control of the data recording unit 7 so as to generate optical beam such as laser beam, thereby irradiating the generated optical beam on an information recording surface of the disk 2. The irradiated optical beam forms the pits corresponding to the record data so as to record the record data on the disk 2.

At that time, when starting to record the record data, the optical pickup 3 receives the reflected beam from the optical disk 2 so as to detect a period of the wobbling, thereby outputting the wobbling detection signal corresponding to the period of the wobbling to the PLL 23 and the CPU 20.

The CPU 20 detects the address information on the recording track according to the wobbling detection signal so as to output the address information to the data recording unit 7. The address information causes the data recording unit 7 to recognize a record position of the optical disk 2, on which the record data should be recorded, according to the outputted address information, thereby recording the record data on the record position thereof.

Furthermore, the information recording/reproducing apparatus 1 comprises a reproduction signal production unit 11 for receiving an optical signal corresponding to reflected beam from the disk 2 so as to produce a reproduction signal corresponding to the reflected beam, a binary slicing unit 12 for binarizing the reproduction signal into a binary signal and a sync detecting unit 13 for detecting a sync pattern according to the binary signal.

The information recording/reproducing apparatus 1 comprises a PLL 14 for supplying a clock signal to the sync detecting unit 13 and other units in the information recording/reproducing apparatus 1, clock signal that is a reference signal by which the sync detecting unit 13 and other units are operated.

The information recording/reproducing apparatus 1 comprises a hold signal generating unit 15 operative to generate a hold signal for controlling the operations of the PLL 14 and a data reading unit 16 for reading reproduction data from the generated sync pattern by the sync detecting unit 13 so as to output the read reproduction data.

Furthermore, the information recording/reproducing apparatus 1 comprises a CPU 20 connected with the optical pickup 3, the ECC block configuration unit 5, the linking block inserting unit 6 and the data recording unit 7 so as to permit data communication thereamong.

The CPU 20 supervisorily controls the above whole information recording operations executed through the optical pickup 3, the ECC block configuration unit 5, the linking block inserting unit 6 and the data recording unit 7.

Furthermore, the CPU 20 is also connected with the reproduction signal producing unit 11, the binary slicing unit 12, the sync detecting unit 13, the PLL 14, the hold signal generating unit 15 and the data reading unit 16 so as to permit data communication thereamong.

The CPU 20 supervisorily controls the above whole information reproducing operations executed through the reproduction signal producing unit 11, the binary slicing unit 12, the sync detecting unit 13, the PLL 14, the hold signal generating unit 15 and the data reading unit 16.

The information recording/reproducing apparatus 1 also comprises a memory 21 to which the CPU 20 can freely access so that the CPU 20 can freely read/write data required for its operations from/on the memory 21. On the memory 21, a program causing the CPU 20 to execute the information recording/reproducing processing function is stored.

Next, linking block inserting operations the information recording/reproducing apparatus 1 according to the first embodiment and the data configuration including the linking block inserted on the basis of the linking block inserting operations are explained hereinafter.

That is, the user data digitized by the A/D converter in the information recording/reproducing apparatus 1 is inputted in the ECC block configuration unit 5. The ECC block configuration unit 5 subjects the same scramble to the user data so as to add parity bits to the scrambled user data, thereby configuring the ECC block.

Figure 2:
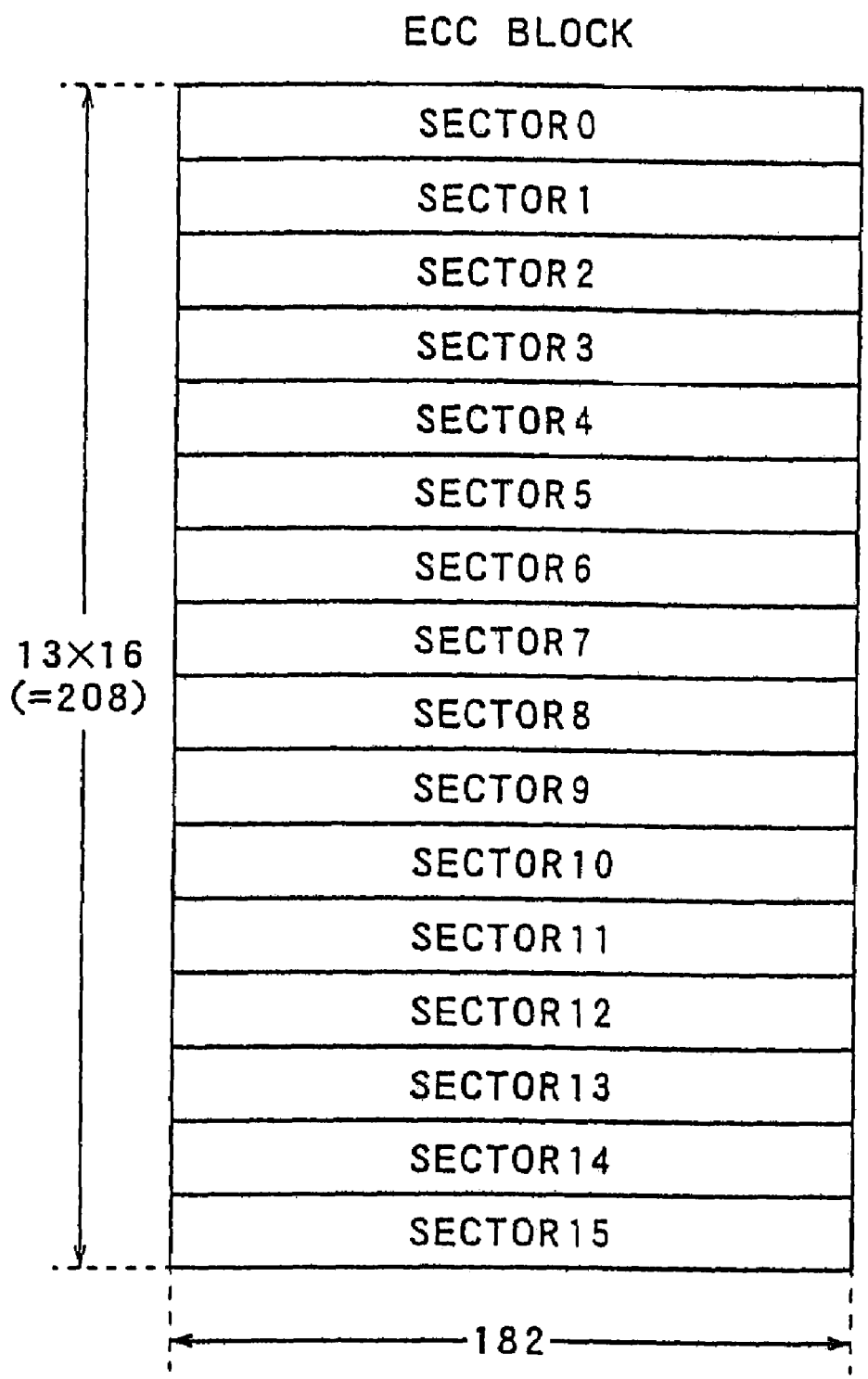
FIG. 2 is a view showing an ECC block configured by an ECC block configuration unit in DVD data format, shown in FIG. 1 according to the first embodiment of the present invention.

FIG. 2 shows the ECC block configured by the ECC block configuration unit 5 in DVD data format, shown in FIG. 1.

The ECC block is served as a unit block by which the error-correction processing is applied to the inputted user data.

As shown in FIG. 2, the 16 sector data (sector 0~sector 15) that are continuously arranged on the disk correspond to one ECC block. Each sector included in the ECC block in FIG. 2 is configured to have a matrix shape of 182 bytes×13 lines so that the ECC block is configured to have a matrix shape of 182 bytes×208 lines.

Figure 3:
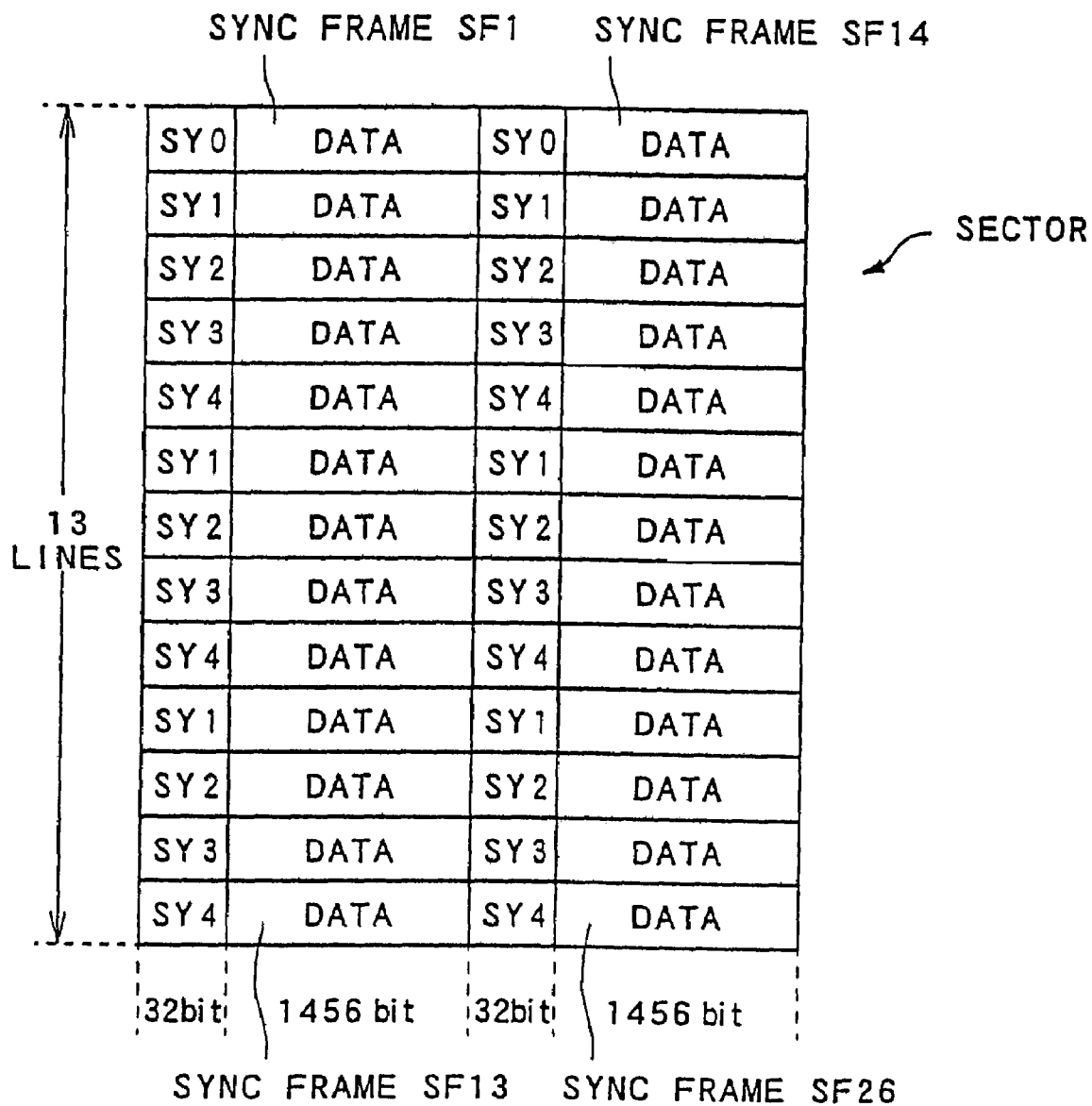
FIG. 3 is a view showing a configuration of each of sectors shown in FIG. 2 according to the first embodiment of the present invention.

FIG. 3 shows a configuration of each of the sectors. As shown in FIG. 3, 13 lines consisting of one sector is divided into two groups of data so that 32 bit sync code (SY0~SY7), as an item of identification. information, is added to each group of each data consisting of 91 bytes (1456 bits). The data portion partitioned by each of the added sync code of each data is configured as the sync frame. Each of the sync code is served as an identification code for identifying the corresponding sync frame when reproducing the ECC block.

In FIG. 3, each line consists of two sync frames so that each sector includes 26 sync frames SF1~SF26 in all. Each block, therefore, has a data configuration (data format) divided into 16×26 sync frames in all so as to be arranged into a block.

In the sync code, a pulse having a channel bit width of 14T, the T representing a bit clock period per channel, is sank so that the sync code pattern is longer than the pattern of the longest channel bit width 11T, which appears at the data portion, making it possible to distinguish the sync code from the data portion to identify it.

Trains of 9 channel bits at the heads of the sync codes have different bit patterns, respectively, so that eight kinds of sync codes SY0~SY7 are provided. As shown in FIG. 3, the arrangement of the sync codes SY0~SY7 permits the data position in the sector to be identified.

The user data inputted in the ECC block unit 5 is configured as the record data consisting of the ECC blocks so that the record data is transmitted to the linking block inserting unit 6.

The linking block inserting unit 6 receives the transmitted record data so as to insert a linking block in each of the boundary portions between each pair of adjacent ECC blocks.

Figure 4:
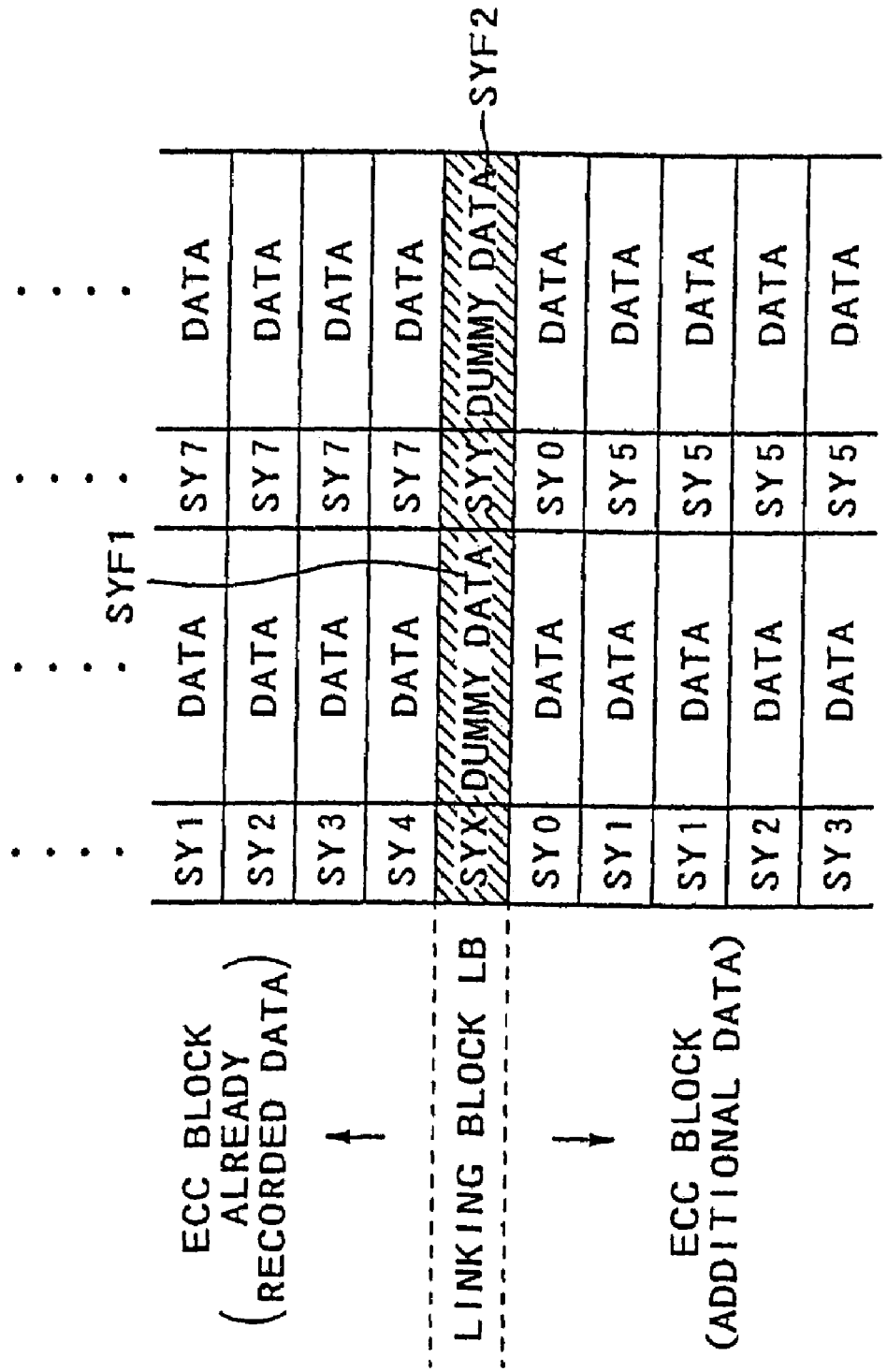
FIG. 4 is a view showing a state that a linking block is inserted on a boundary portion between already recorded data and additional data on a disk according to the first embodiment of the present invention.

FIG. 4 is a view showing a state that the linking block is inserted on the boundary portion between the already recorded data and additional data on the disk 2.

That is, the linking block inserting unit 6, as shown in the oblique lines (hatchings), inserts a linking block LB in a region of two sync frames (first sync frame SYF1 and a second sync frame SYF2) between the ECC block at the last of the already recorded data and that at the head of new additional data. Both of the ECC blocks just before and after the linking block have the same configuration of the ECC block shown in FIG. 3, but at least one of code patterns of sync codes SYX, SYY of the two sync frames in the linking block is different from those of usual sync codes SX0~SX7 so as to be set as special sync code pattern.

That is, the linking block inserting unit 6 adds a sync code SYX different from the usual sync codes SX0~SX7 to the first sync frame SYF1 in the inserted linking block LB, and adds a sync code SYY different from the usual sync codes SX0~SX7 to the second sync frame SYFs in the inserted linking block LB.

At least one of codes patterns of the added sync codes SYX, SYY is different from the code patterns of the usual sync codes SX0~SX7 so that referring at least one of the sync codes SYX, SYY permits the linking block LB to be distinguished from the actual data portion. On each data portion of each of the sync frames SYF1 and SYF2 included in the linking block LB, dummy data, as shown in FIG. 4, is recorded in place of the actual data, or no data is recorded.

In this embodiment, the linking block inserting unit 6 inserts the linking block LB on each of the boundary portions between each pair of adjacent ECC blocks on the disk 2. In this configuration, the linking block LB is always inserted between each of the already recorded data and each new additional data when recording each new additional data on the disk 2, and the linking block LB is within three sync frames in size, for example, a little two sync frames in size, as compared with the ECC block including 16×26 sync frames, making it possible to prevent a waste of the recording capacity of the disk 2, thereby making use efficiently of the recording capacity thereof.

The present invention, however, is not limited to the structure of inserting the linking block LB in all boundary portions. That is, the linking block inserting unit 6 may select at least one of the boundary portions between all adjacent ECC blocks so as to insert the at least one of the selected boundary portion.

Figure 5:
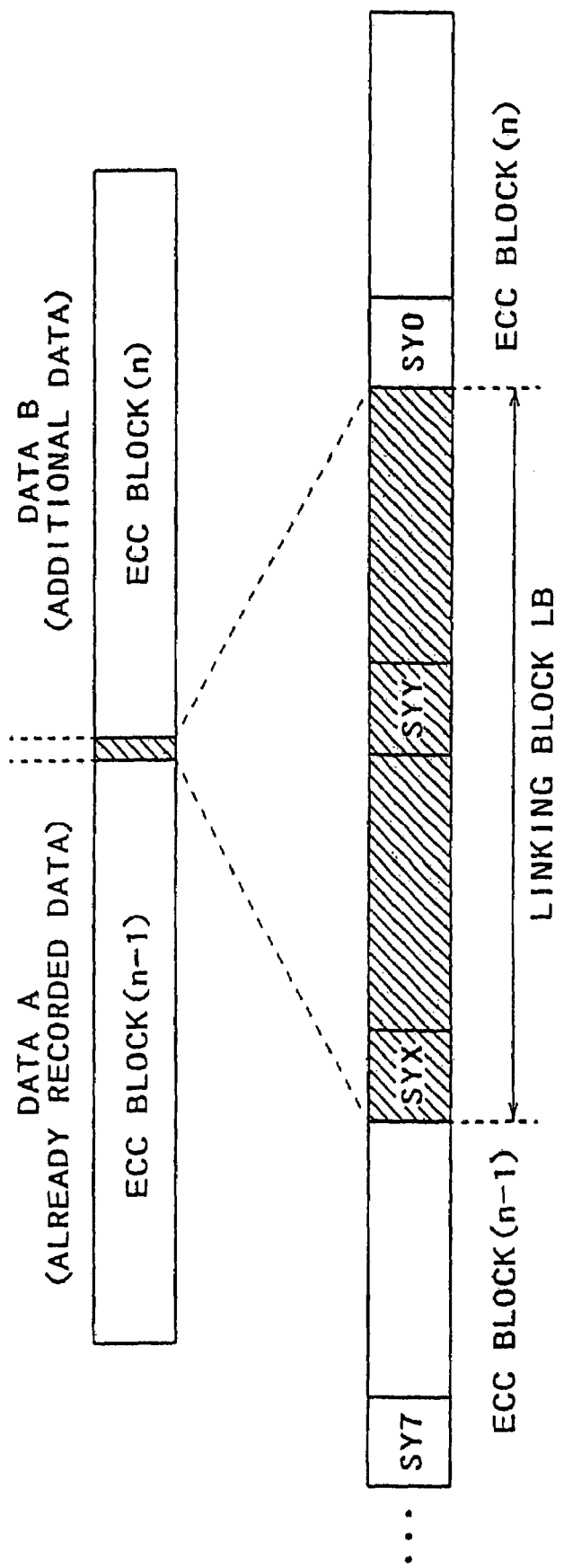
FIG. 5 is a view representing a data portion including the linking block shown in FIG. 4 in accordance with a data arrangement on the disk according to the first embodiment of the present invention.

FIG. 5 is a view representing the data portion including the linking block LB shown in FIG. 4 in accordance with a data arrangement on the disk 2. In FIG. 5, the data A is taken as the already recorded data, and the ECC block (n-1) is taken as the last one of the ECC blocks of the data A. The data B following after the data A is taken as the additional data, and the ECC block (n) is taken as the head one of the ECC blocks of the data B. As shown in FIG. 5, the linking block LB consisting of the two sync frames is inserted on the boundary portion between the ECC block (n-1) and the ECC block (n).

The data recording unit 7, therefore, stops the recording proceeding of the data A at the ECC block (n-1) at the last end therein so as to shift to the linking block LB, thereby starting to record the data B from its ECC block (n) at the head end therein. On the connection portion between the data A and the data B, the linking block LB is inserted in a state that continuity from the data A to the data B is interrupted once.

When reproducing the disk on which the data is arranged as shown in FIG. 5, the reproducing operation with respect to the data A is performed so as to be reached to the ECC block (n-1), and, after the reproducing of the data A is completed, the sync code SYX in the linking block LB is detected. The code pattern of sync code SYX is different from that of each of the sync codes SY0~SY7 so that it is possible to easily distinguish the position of the linking block LB. A concrete configuration of detecting the sync code SYX when reproducing the data is described hereinafter. Incidentally, the sync code SYY may be detected in order to distinct the linking block LB, but, in this embodiment, the sync code SYX is detected so as to distinct the linking block LB.

Next, the recording track on the disk 2 according to the first embodiment is described hereinafter, referring to FIG. 6.

Figure 6:
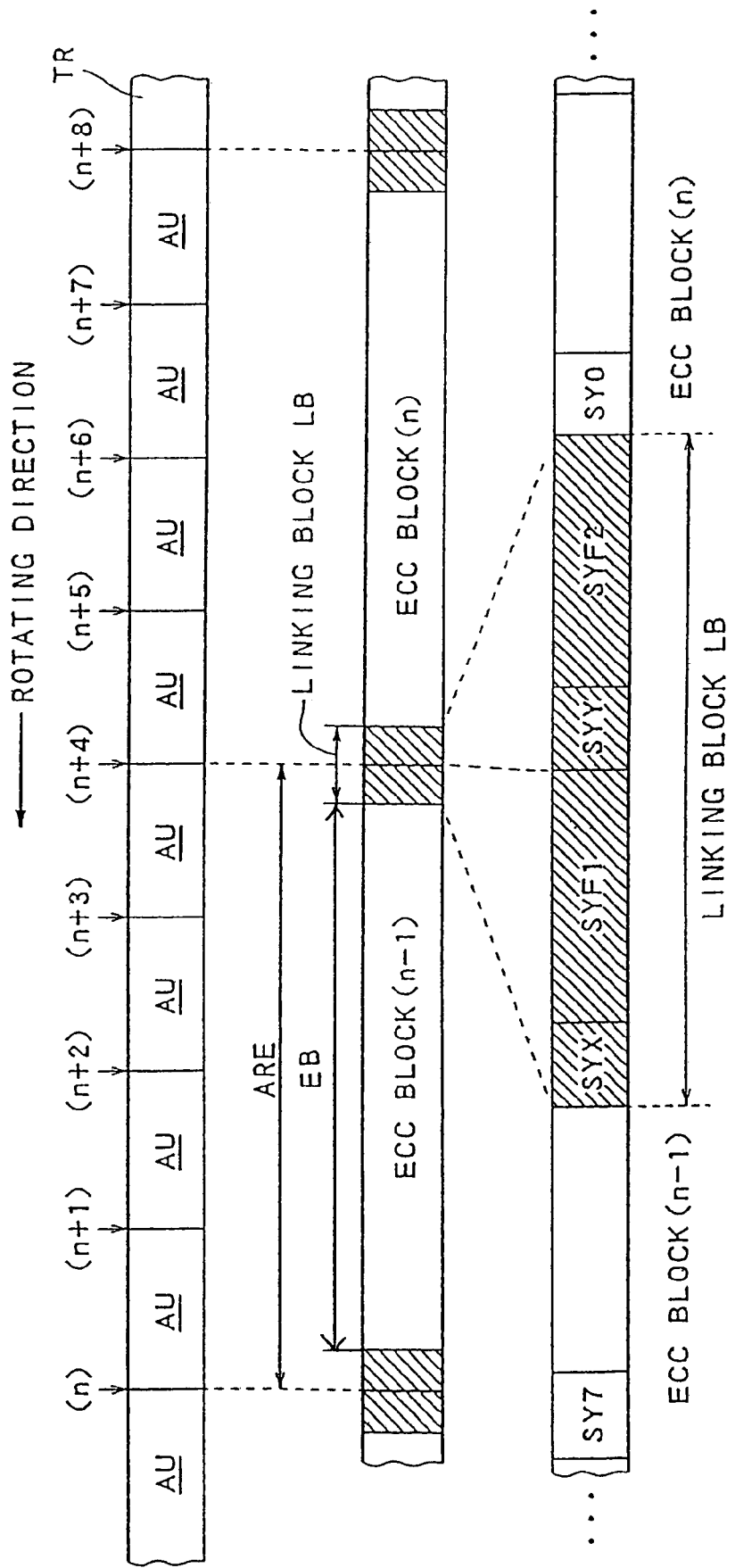
FIG. 6 is a view showing a frame format of a relationship between a structure of a recording track on an unrecorded disk and that of a record data according to the first embodiment of the present invention.

FIG. 6 is a view showing a frame format of a relationship between a structure of the recording track on the unrecorded disk 2 and that of the record data described above. The structure of the recording track is shown with its enlarged scale.

A top of FIG. 6 shows items of the address information, each of which uniquely identifies a location in the record data. The items of the address information are previously stored on the recording track TR on the disk 2. The recording track TR is divided into address units AU in its longitudinal direction, that is, a circumferential direction of the disk 2, each of which corresponds to each of the items of the address information.

That is, for example, the record data which should be recorded on the location of address n is recorded on the address unit AU corresponding to the item of address information having the value of address n. The item of address information corresponding to each address unit AU is stored in such a manner that, while the recording track TR in each address unit AU is wobbled, the period of the wobbling is phase-modulated by the item of address information corresponding to each address unit AU.

On the disk 2 of the first embodiment, as shown in FIG. 6, each item of address unit AU is formed so that the boundary portion between one address unit AU on which the last data of one of the ECC blocks is recorded and another one address unit AU on which the first data of another one of the ECC blocks following from the one of the ECC blocks is recorded coincides with the boundary portion between the sync frames corresponding to the linking block after each of the ECC blocks is recorded.

That is, as shown in FIG. 6, when the sync code SYX follows from the last data of the ECC block (n−1), the location on which the data at an after end of the sync frame SYF1 in the linking block LB including the sync code SYX is recorded, after end which is opposite to the sync code SYX side end, coincides with an after end of the last one in the address units AU which correspond to the ECC block (n−1). In addition, as shown in FIG. 6, when the sync code SYY is ahead of the first data of the ECC block (n), the location on which the data at a before end of the sync code SYY is recorded, before end which is adjacent to the after end of the sync frame SYF1, coincides with a before end of the first one in the address units AU which correspond to the ECC block (n).

Incidentally, FIG. 6 shows that an area on the disk 2, on which the record data including one ECC block and the data corresponding to one sync frame of the linking block LB in either side of the one ECC block is recorded, corresponds to four address units AU. For example, an area ARE on the disk 2, on which the record data including the ECC block (n−1) and the data corresponding to one sync frame of the linking block LB in either side of the ECC block (n−1) ought to be recorded, corresponds to four times as wide as each address unit. That is, the area ARE corresponds to four address units AU (n+1)~AU (n+4).

That is, each ECC block and each linking block corresponding thereto are recorded on each area ARE which is zoned so as to correspond to zonings of the address units AU so that it is possible to accurately distinct the position of the linking block by referring the address units AU.

As described above, the information recording/reproducing apparatus 1 according to the first embodiment comprises the ECC block configuration unit 5, as record data configuration means, for configuring the data having the data configuration described above with respect to the information recording medium, such as a DVD-RW, DVD-R or the like, and the linking block inserting unit 6, as linking block inserting means, for inserting the linking block having the described feature in the record data.

In addition, the information recording/reproducing apparatus 1 according to the first embodiment comprises the data recording unit 7, as data recording means, for controlling, as described above, the record of additional data with respect to the information recording medium, such as a DVD-RW, DVD-R or the like.

Figure 7:
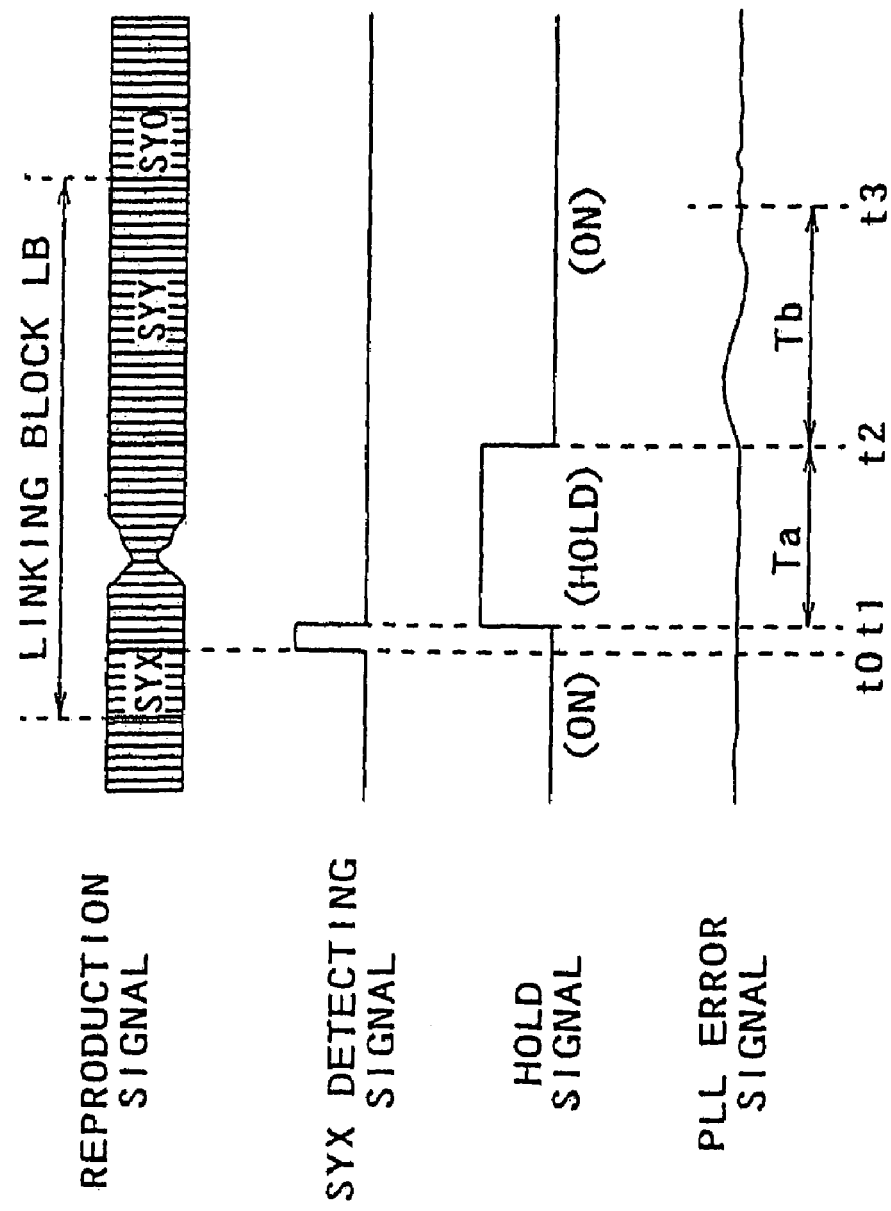
FIG. 7 is a view showing waveform patterns of signals outputted from units of the information recording/reproducing apparatus in a case where a linking block of the disk is reproduced thereby according to the first embodiment of the present invention.

Next, linking block detecting operations by the information recording/reproducing apparatus 1 according to the first embodiment when reproducing the disk 2 are explained while referring to FIG. 1 and FIG. 7.

FIG. 7 is a view showing waveform patterns of signals outputted from the units 11, 13, 14 and 15 of the information recording/reproducing apparatus 1 in a case where the linking block of the disk is reproduced thereby.

That is, the light bean is irradiated from the optical pickup 3 with respect to a target recording track on the disk 2 which is rotatably driven. A reflection light from the target recording track on the disk 2 is detected by a detector in the optical pickup 3. The detected signal from the optical pickup 3 is inputted into the reproduction signal producing unit 11 so that a reproduction signal whose levels are changed according to the pit on the target track and the land thereon, land at which the pit is not formed. For example, in cases where the detector of the optical pickup 3 has four divided detecting areas, the reproduction signal producing unit 11 adds the detected signals by the four divided detecting areas in the detector so as to produce the reproduction signal.

Then, in top of FIG. 7, the waveform pattern of the reproduction signal is shown when the data portion including the linking block LB of the disk 2 as shown in FIG. 5. FIG. 7 clearly represents that the reproduction signal has stable levels when the data A before the reproduction of the linking block LB is reproduced and the data B after the reproduction of the linking block LB is reproduced. On the contrary, FIG. 7 clearly represents that the distortion of the level in the reproduction signal occurs when the linking block LB is reproduced. When recording additional data (data B), missing the synchronization between the data before and after the boundary portion of the additional data and the already recorded data because of the data between the data before and after the boundary portion being indefinite causes the above distortion of the level in the reproduction signal. The configuration of the information recording/reproducing apparatus 1 according to this embodiment permits the data before and after the boundary portion to be synchronized with each other.

Next, the binary slicing unit 12 slices the reproduction signal by a predetermined level so as to binarize it, thereby producing a binary signal corresponding to the data pattern of the record data on the disk 2. The sync detecting unit 13 detects distinguishably the usual sync patterns SY0~SY7 or the sync patterns SYX and the SYY included in the linking block LB on the basis of the binary signal from the binary slicing unit 12. The sync detecting unit 13 outputs a SYX detecting signal for distinguishing timing at which the sync pattern SYX in the linking block LB is detected.

As shown in FIG. 7, the SYX detecting signal is a pulse signal which is turned into a high level from the detection timing t0 of the sync pattern SYX in the data pattern included in the binary signal so as to keep the high level state in a short time.

The PLL 14 inputs the binary signal therein and is served as clock sampling means for sampling a clock signal synchronized with the reproduction signal. The PLL 14 contains an oscillating circuit whose oscillating frequency and phase are controlled by a PLL error signal whose levels are changed in conjunction with the binary signal. The PLL 14 becomes a lock state until a predetermined capturing time elapses from the start of the operation of the PLL 14, and after the capturing time elapses, the PLL 14 outputs stable clock signals. The clock signals outputted from the PLL 14 are supplied to each unit of the information recording/reproducing apparatus 1 and the sync detecting unit 13 so as to be used as reference signals of the synchronization when detecting the sync code SYX.

The hold signal generating unit 15 generates a hold signal on the basis of the SYX detecting signal outputted from the sync detecting unit 13 so as to supply the hold signal to the PLL 14. The hold signal is a signal which is adapted to control a state of the PLL error signal, and to distinguish a predetermined time for which the level of the PLL error signal in the linking block is kept.

Then, the waveform pattern in the hold signal is shown in FIG. 7. The hold signal has the waveform pattern such that the signal rises at the timing t1 of the fall of the SYX detection signal so as to keep the high level until a predetermined hold time Ta elapses, so that, after the predetermined hold time Ta elapses, the signal falls at the timing of t2, wherein the hold time Ta is defined as the elapsing time from the t1 to that of t2. As shown in bottom of FIG. 7, the PLL signal keeps the high level for the hold time Ta.

Before the timing t1, the waveform of the PLL signal is changed according to the control states of the PLL 14. At the timing t2, the PLL 14 is turned to an unlocked state, so that the PLL 14 executes new capturing operations from the timing t2 to the timing t3 until which a predetermined time Tb elapses, whereby, after the timing t2, the waveform of the PLL error signal is changed again according to the control states of the PLL 14. Incidentally, because the frequency of the PLL 14 is suitably set while the PLL 14 executes the capturing operations, the time Tb is a time required for matching phases of the PLL 14.

The data reading unit 16 reads data portions following from the sync frames distinguished according to the sync code detected by the sync detecting unit 13. The data reading unit 16 also subject the data portion to various signal processings including error-correction processing and so on, which are required for reading the data portion, so as to output the data portion as the reproducing data.

According to each waveform pattern shown in FIG. 7, in a case where the linking block of the disk is reproduced, it is necessary to set the last edge position of the linking block LB before the elapse of the capturing time Tb. First, the hold time Ta is set to a degree of time permitting the distortion of the waveform in the at least reproduction signal to be avoided. The capturing time Tb is determined on the basis of the characteristics such as the frequency band of the PLL 14 and so on. The length of the linking block LB must be set by taking into consideration of the hold time Ta and the capturing time Tb. Concretely, setting the length of the linking block LB to one sync frame usually causes the capturing time TB to be shortened so that the frequency band of the PLL 14 is excessively wide. It is desired, therefore, to set the length of the linking block LB to two sync frames or more thereof. In cases where, however, the characteristic of the PLL 14 is secured, it is possible to set the length of the linking block LB to one sync frame. In cases of setting the length of the linking block LB over and above what is needed, the linking block LB, bears on the recording capacity on the disk 2 so that it is desired to set the linking block LB within three frames.

The configuration such that the length of the linking block is set within three frames permits the size in the disk 2 required for the linking block to be decreased, thereby making use effectively the recording capacity on the disk 2.

In this embodiment, the PLL 14, as the clock sampling processing, stops the extracting of clock signal once when the reproduction processing is reached to the linking block LB, and after the predetermined hold time Ta elapses, samples again the clock signal so that it is possible to keep the PLL error signal to constant value for the hold signal Ta. As a result, it is possible to forestall the bad effects with respect to the extraction of the clocks, such as a phase slip of the PLL or the like, due to the distortion of the waveform of the reproduction signal at which the already recorded signal is switched to the additional data, thereby controlling stably the frequency and the phase of the PLL to extract the clock signals.

A configuration of a modification of the first embodiment is explained in cases of applying the above linking block LB to a DVD-ROM as the reproduction-only information recording medium. The object of this modification is to apply the present invention to the DVD-ROM so as to permit the compatibility between the above recordable/writable information recording medium such as the DVD-RW/the DVD-R and the DVD-ROM to be secured.

Figure 8:
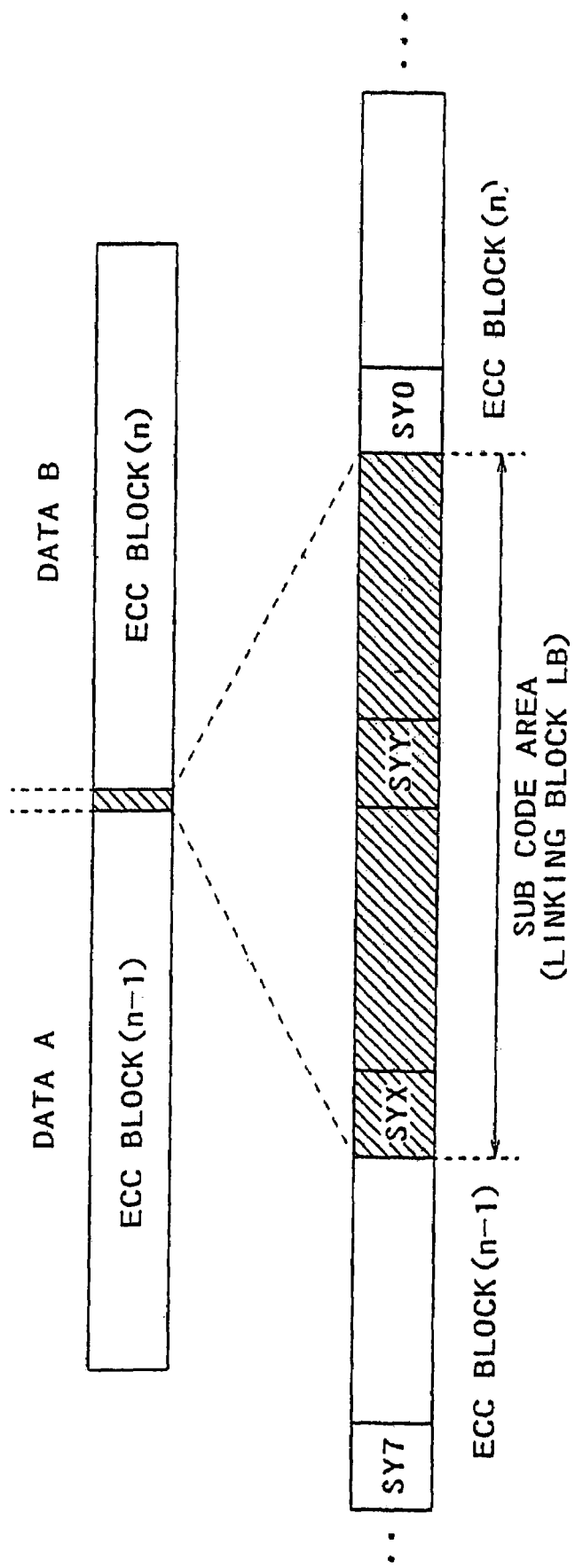
FIG. 8 is a view representing a data portion including the linking block in accordance with a data arrangement which is the same as that in FIG. 5 on a DVD-ROM as a disk according to a modification of the first embodiment.

FIG. 8 is a view representing the data portion including the linking block LB in accordance with the data arrangement which is the same as that in FIG. 5 on the DVD-ROM as the disk 2.

In FIG. 8, in a different point as compared with FIG. 5, the linking block LB is utilized as a sub code area on which sub code playing a special role is recorded. Incidentally, other points are the same as those in FIG. 5. The data configuration shown from FIG. 2 to FIG. 4 is basically the same as that in FIG. 8, but the sub code is recorded on the data portions of two sync frames SYF1 and SYF2 included in the linking block LB in place of the dummy data.

The sub code area in the DVD-ROM is a redundant area because no data essentially is recorded thereon, whereas, in this modification, it is possible to record on the sub code area various items of control information required for the reproduction control. For example, it may be possible to write an initial value of the scramble processing to which the recorded data is subjected on the sub code area. That is, the initial value of the scramble processing is obtained according to the recording position of the record data, but, in this modification, it is possible to easily determine the initial value of the scramble processing because the initial value is previously recorded as the sub code.

In cases of recording various items of control information on the sub code area as the sub code, the sub code area must be read when reproducing the DVD-ROM, but, in this modification, it is possible to detect the sync code SYX or SYY added to the linking block LB on which the various items of control information are recorded so as to simply read the various items of control information, thereby being identified.

An information reproducing apparatus for reproducing the DVD-ROM related to the modification comprises an information reproducing apparatus including elements which are the same as the optical pickup 3, the reproduction signal production unit 11, the binary slicing unit 12, the PLL 14, the hold signal generating unit 15, the data reading unit 16, the CPU 20 and the memory 21 so that the information reproducing apparatus can detect the linking block LB as described above. Incidentally, in cases where it is secured to continually extract proper clock signals when reproducing the DVD-ROM, the hold signal detecting unit 15 may not be especially provided, but it is on necessary to detect the sync code SYX.

As described above, according to the information recording/reproducing apparatus 1, when recording the record data on the disk 2 on which the items of address information are previously stored in consideration of the area including the ECC block and the linking block LB, the linking block LB with two sync frame length is inserted on each boundary portion between each of the ECC blocks, and the sync codes SYX, SYY each having special patterns, respectively, are added to the linking block LB. When reproducing the disk 2, the sync code SYX is detected to distinct the position of the linking block so that the PLL 14 is kept to a hold state during the linking block being reproduced, whereby the PLL executes new capturing operations during the data portion following from the linking block being reproduced.

This configuration permits the linking block not to be formed in each ECC block, preventing the error-correction performance from being deteriorated, and avoiding that the whole ECC block can not be used for recording data. The use of the data portion as the linking block, which is sufficiently shorter than the ECC block, permits a wasteful capacity in the recording capacity of the disk to be decreased.

As a result, it is possible to improve the reliability of the record data without affecting the error-correction performance of each block. In addition, it is also possible to get rid of a wasteful area in each block and to prevent the size of the linking block, thereby making use of the recording capacity of the information recording medium.

When reproducing the disk, detecting the sync code SYX causes the position of the linking block to be securely identified, and the PLL 14 to be suitably controlled according to the position of the linking block so as to allow PLL 14 to stably extract clock signals, thereby improving the reliability of the reproduction signal.

It is also possible to secure the compatibility between the disk on which data can be recorded, such as the DVD-R, DVD-RW and so on, and a reproduction-only disk such as the DVD-ROM, thereby improving the usability of the disks.

Furthermore, in this embodiment, because the linking blocks are formed on all of the boundary portions to which all ECC blocks are adjacent, respectively, it is possible to configure the record data in regular data format, permitting to be simplified a detecting circuit for detecting the linking block at the time of the disk being reproduced.

Second Embodiment

Figure 9:
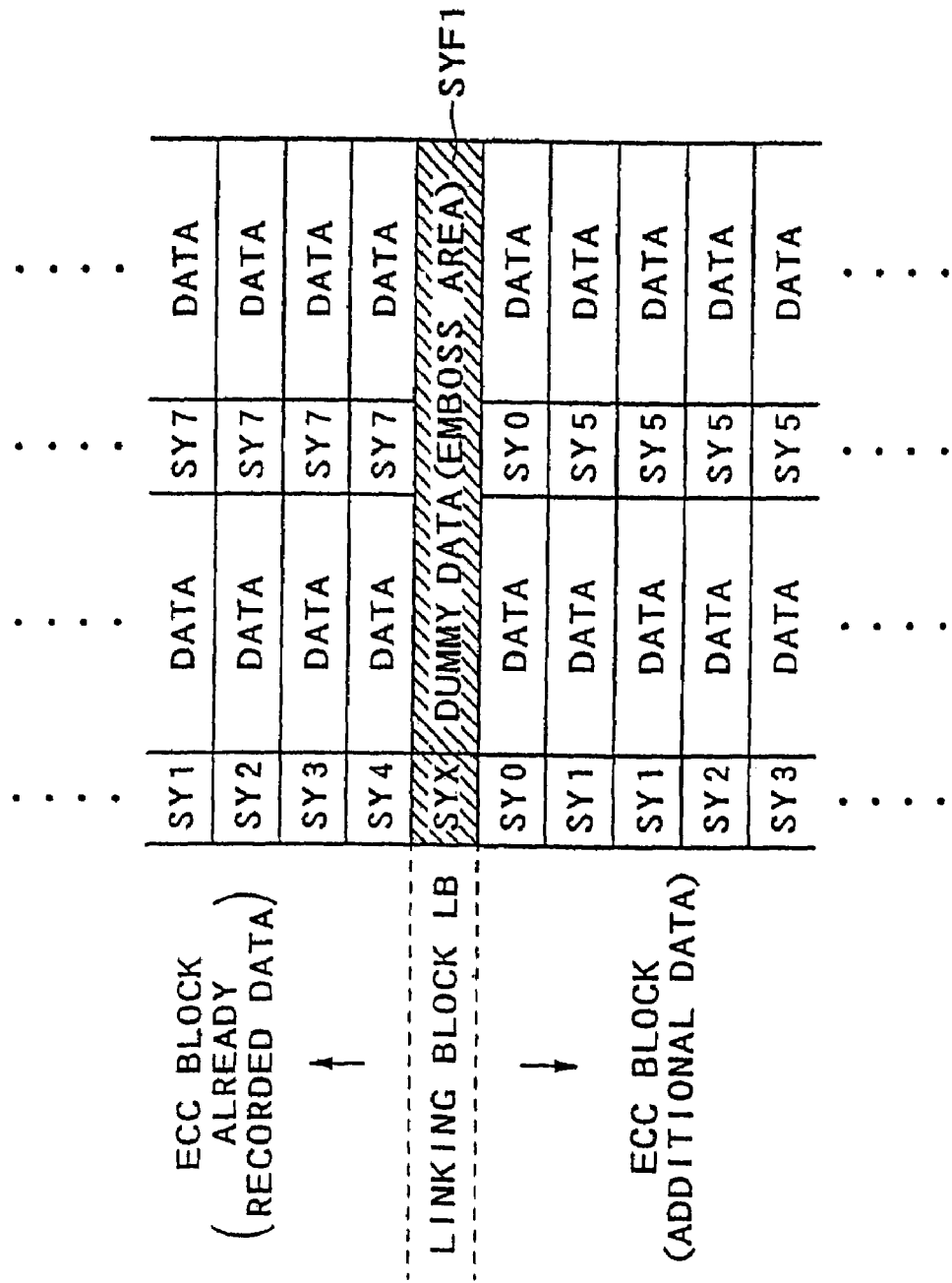
FIG. 9 is a view showing a state that a linking block is inserted on a boundary portion between an already recorded data and additional data on a DVD-RW/DVD-R as a disk according to a second embodiment of the present invention.

FIG. 9 is a view showing a state that a linking block is inserted on a boundary portion between an already recorded data and additional data on a DVD-RW/DVD-R as a disk according to a second embodiment of the present invention. Incidentally, a functional block diagram of an information recording/reproducing apparatus 1A according to the second embodiment is the same as that of the information recording/reproducing apparatus 1 according to the first embodiment, omitting the explanation of the functional block diagram of the information recording/reproducing apparatus 1A.

The linking block has an essential role, as explained in the first embodiment, for keeping additional data away from the already recorded data at a predetermined interval when recording the additional data on the recording disk 2, such as, DVD-RW/DVD-R or the like. In this embodiment, however, the linking block is formed on the reproduction-only disk 2, such as DVD-ROM or the like so that the recording format of the reproduction-only disk 2 is made common to the recording disk 2.

Inserting operations of the linking block with respect to the recording disk 2, such as DVD-RW/DVD-R or the like, is explained at first.

That is, in this embodiment, the linking block inserting unit 6A, as shown by oblique lines in FIG. 9, inserts the linking block LB on an emboss area previously formed on the recording track of the recording disk 2 so that the linking block LB holds the emboss area, preventing data on the linking block LB from being recorded.

The linking block inserting unit 6A adds a sync code SYX different from the usual sync codes SX0~SX7 to a first sync frame SYF1.

The added sync coded SYX has a code pattern which is different from those of the usual sync codes SX0~SX7 so that referring the sync code SYX permits the linking block LB to be distinguished from the actual data portion. On the emboss area, dummy data, as shown in FIG. 8, is recorded.

Figure 10:
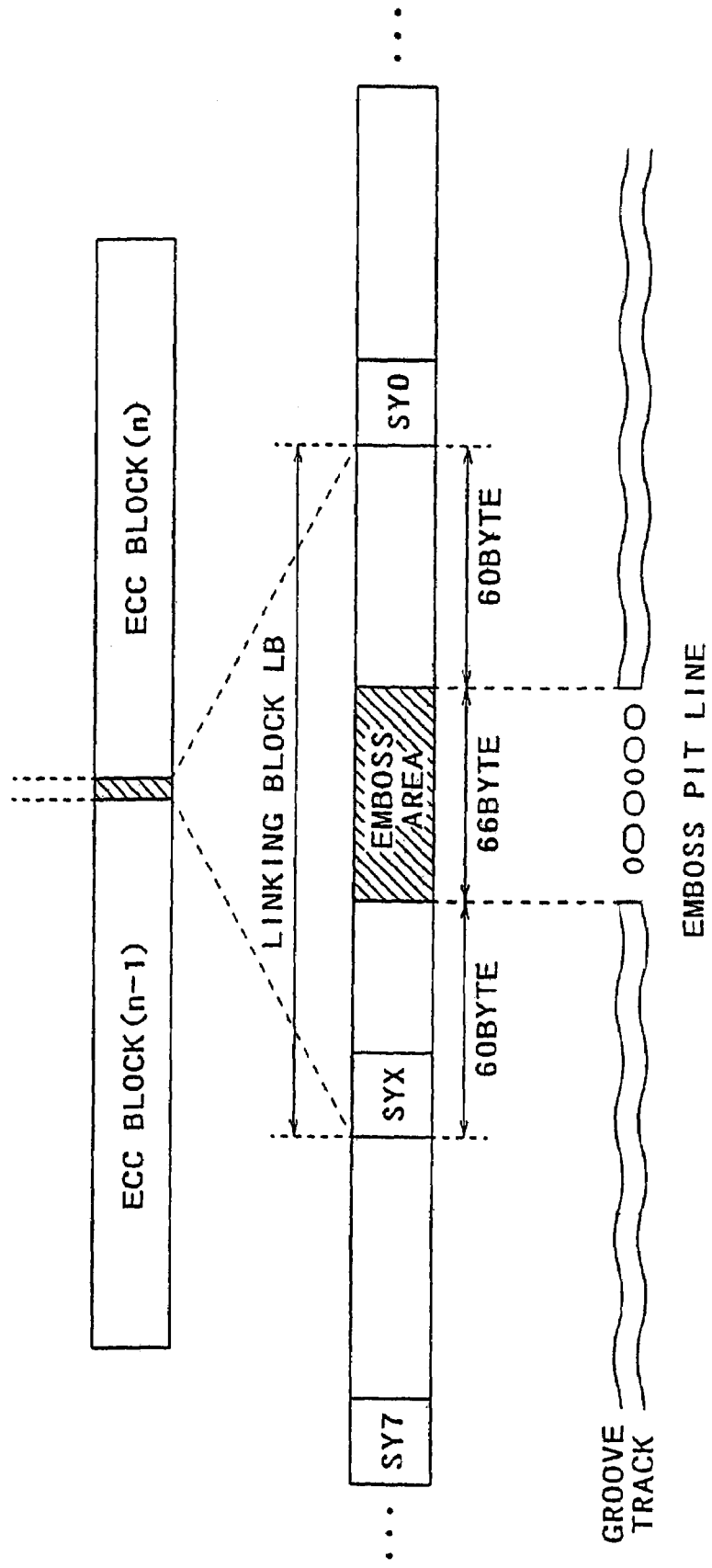
FIG. 10 is a view representing a data configuration of the linking block applied to the DVD-RW/DVD-R as the disk according to the second embodiment.

Next, FIG. 10 is a view representing a data configuration of the linking block applied to the DVD-RW/DVD-R as the disk 2 according to the second embodiment. As shown in FIG. 10, the linking block is formed on the boundary portion between the preceding ECC block (n−1) and the following ECC block (n). The emboss area is formed on the intermediate portion of the linking block LB. Then, because the sync code SYX at the head in the linking block LB is added when recording the data on the DVD-RW/DVD-R, the only emboss area exists in the linking block LB in cases where no data is recorded on the DVD-RW/DVD-R.

In FIG. 10, the emboss area is arranged within a zone of 66 bytes in length in the linking block LB total of which is 186 bytes in length other than its head zone of 60 bytes in length and its last zone of 60 bytes length therein.

Because, when the emboss area forming with a line of emboss pits is excessively close to the recording areas adjacent to the linking block, the emboss area can cause recording films on the recording areas to be deteriorated, the emboss area is arranged away from the recording areas at a predetermined distance, which are adjacent to the linking block LB so as to forestall the deterioration of the recording areas adjacent to the linking block.

The head in the linking block LB is blank in cases where no data is recorded on the DVD-RW/DVD-R, whereas, in cases where data is recorded on the DVD-RW/DVD-R, the sync code SYX is added to the head in the linking block. The sync code SYY which is added to the linking block on the DVD-ROM is not added to that on the DVD-RW/DVD-R because the sync code SYY is overlapped on the emboss area so as not to read the sync code SYY.

The shape of recording track in the linking block is shown in the bottom side in FIG. 10. The groove track as the recording track is wobbled so that, when recording data on the recording track, recording marks corresponding to the record data are formed on the groove track except for the linking block.

The emboss area is formed with the emboss pit line including emboss pits and lands arranged alternately. The pattern of the emboss pit line is changed according to the dummy data. Data is prevented from being recorded on the emboss area, and even if the recording mark is illegally copied to be recorded on the emboss area, the interference of the emboss pit line to the recording mark makes impossible reproduce the recording mark. This operation is described hereinafter, Next, linking block detecting operations by the information recording/reproducing apparatus 1A according to the second embodiment when reproducing the DVD-RW/DVD-R as the disk 2 are explained while referring to FIG. 1 and FIG. 11.

Figure 11:
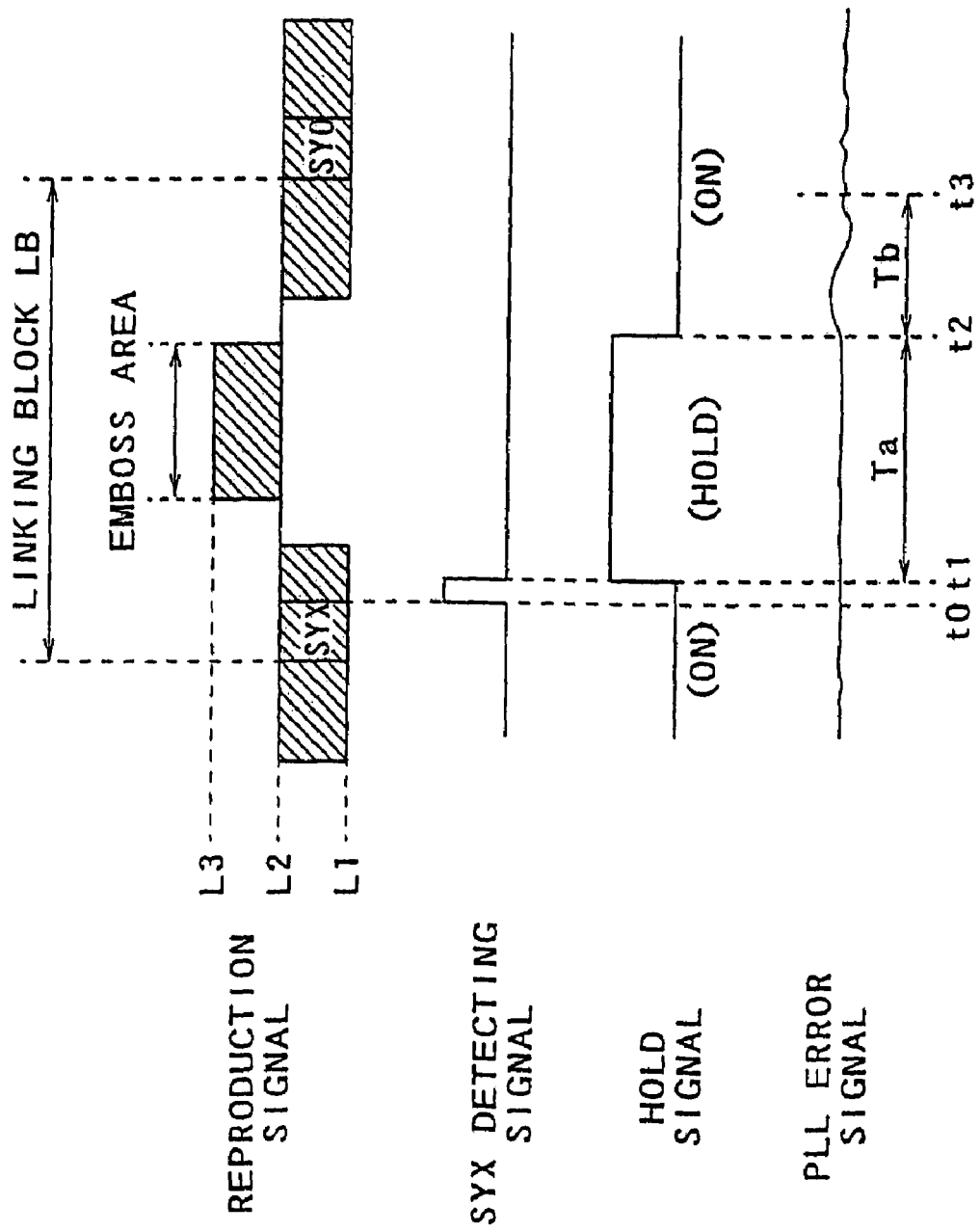
FIG. 11 is a view showing waveform patterns of signals outputted from units of an information recording/reproducing apparatus in a case where a linking block of a disk, such as DVD-RW/DVD-R is reproduced thereby according to the second embodiment of the present invention.

FIG. 11 is a view showing waveform patterns of signals outputted from the units 11, 13, 14 and 15 of the information recording/reproducing apparatus 1A in a case where the linking block of the disk, such as DVD-RW/DVD-R is reproduced thereby.

That is, the light beam is irradiated from the optical pickup 3 with respect to a target recording track on the disk 2 which is rotatably driven. A reflection light from the target recording track on the disk 2 is detected by the detector in the optical pickup 3. The detected signal from the optical pickup 3 is inputted into the reproduction signal producing unit 11 so that a reproduction signal whose levels are changed according to the pit on the target track and the land thereon, at which the pit is not formed.

Then, in top of FIG. 11, the waveform pattern of the reproduction signal is shown when the data portion including the linking block LB of the disk 2. FIG. 11 clearly represents that the reproduction signal has different levels within a range of level L1 to level L2 while the data portion preceding the linking block LB is reproduced and the data portion including the sync code SYX positioned at the head in the linking block LB is reproduced.

FIG. 11 also clearly represents that the reproduction signal has a constant level of L2 while unrecorded areas in the linking block except for the emboss area are reproduced, and that the reproduction signal has different levels within a range of level L2 to level L3 while the emboss area is reproduced.

The shift of the range of the signal level is due to that the characteristic of the level of the reflection beam caused by the presence or absence of the recording mark is changed in reverse as compared with that of the level of the reflection beam caused by the presence or absence of the emboss pit. The reproduction signal shown in FIG. 11 has different DC levels at the preceding and following areas to the linking block, and the emboss area.

When recording the record data on the linking block LB on the disk 2, the recording mark is recorded to be overlapped on the emboss pit line in the emboss area on the groove track so that, when reproducing the groove track on the disk 2, it is impossible to accurately obtain a reproduction signal corresponding to the recorded data on the linking block. On the contrary, when reproducing the data portions preceding and following to the linking block, continuous reproduction must be secured so that, in this embodiment, the configuration described hereinafter permits to be secured the synchronization of the reproduction of the preceding data portion to the linking block with the reproduction of the following data portion thereto.

Next, as shown in FIG. 1, the binary slicing unit 12, similarly to the first embodiment, slices the reproduction signal by a predetermined level so as to binarize it, thereby producing a binary signal corresponding to the data pattern of the record data on the disk 2. The sync detecting unit 13 detects distinguishably the usual sync patterns SY0~SY7 or the sync patterns SYX and the SYY included in the linking block LB on the basis of the binary signal from the binary slicing unit 12.

The PLL 14, similarly to the first embodiment, inputs the binary signal therein so as to sample a clock synchronized with the reproduction signal.

The hold signal generating unit 15 generates a hold signal on the basis of the SYX detecting signal outputted from the sync detecting unit so as to supply the hold signal to the PLL 14. The hold signal is a signal which is adapted to control a state of the PLL error signal, and to distinguish a predetermined time for which the level of the PLL error signal in the linking block is kept.

Then, the waveform pattern in the hold signal is shown in, FIG. 11. The hold signal has the waveform pattern such that the signal rises at the timing t1 of the fall of the SYX detection signal so as to keep the high level until a predetermined hold time Ta elapses, so that, after the predetermined hold time Ta elapses, the signal falls at the timing of t2, wherein the hold time Ta is defined as the elapsing time from the t1 to that of t2. As shown in bottom of FIG. 11, the PLL signal keeps the high level for the hold time Ta.

The data reading unit 16 reads data portions following from the sync frames distinguished according to the sync code detected by the sync detecting unit 13. The data reading unit 16 also subject the data portion to various signal processings including error-correction processing and so on, which are required for reading the data portion, so as to output the data portion as the reproducing data.

According to each waveform pattern shown in FIG. 11 in a case where the linking block of the disk is reproduced, it is necessary to set the last edge position of the linking block LB before the elapse of the capturing time Tb. First, the hold time Ta is set to a degree of time permitting the distortion of the waveform in the at least reproduction signal to be avoided. The capturing time Tb is determined on the basis of the characteristics such as the frequency band of the PLL 14 and so on. The length of the linking block LB must be set by taking into consideration of the hold time Ta and the capturing time Tb. Concretely, setting the length of the linking block LB to one sync frame usually causes the capturing time TB to be shortened so that the frequency band of the PLL 14 is excessively wide. It is desired, therefore, to set the length of the linking block LB to two sync frames or more thereof. In cases where, however, the characteristic of the PLL 14 is secured, it is possible to set the length of the linking block LB to one sync frame. In cases of setting the length of the linking block LB over and above what is needed, the linking block LB bears on the recording capacity on the disk 2 so that it is desired to set the linking block LB within three frames.

Next, operations of inserting the linking block on the reproduction-only disk 2 such as a DVD-ROM is explained according to the second embodiment.

Figure 12:
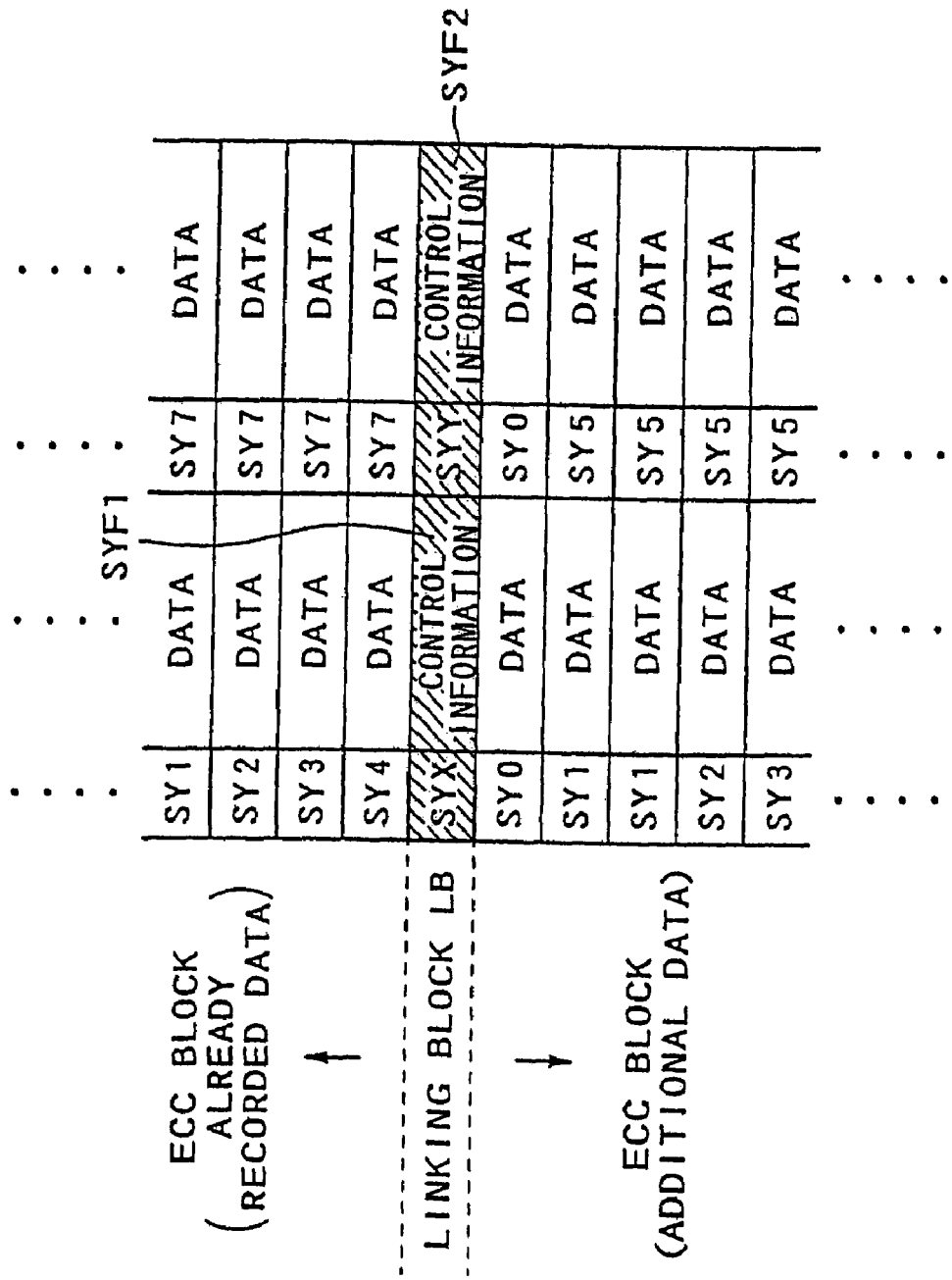
FIG. 12 is a view showing a state that a linking block is inserted on a boundary portion between an already recorded data and additional data on a DVD-ROM as a disk according to the second embodiment of the present invention.

FIG. 12 is a view showing a state that the linking block is inserted on the boundary portion between the already recorded data and additional data on the DVD-ROM as the disk 2.

Incidentally, a functional block diagram of an information recording/reproducing apparatus 1B according to the modification is the same as that of the information recording/reproducing apparatus 1 according to the first embodiment, omitting the explanation of the functional block diagram of the information recording/reproducing apparatus 1B.

That is, the linking block inserting unit 6B, as shown in the oblique lines (hatchings), inserts a linking block LB on a region of two sync frames (first sync frame SYF1 and a second sync frame SYF2) between the ECC block at the last of the already recorded data and that at the head of new additional data.

Figure 13:
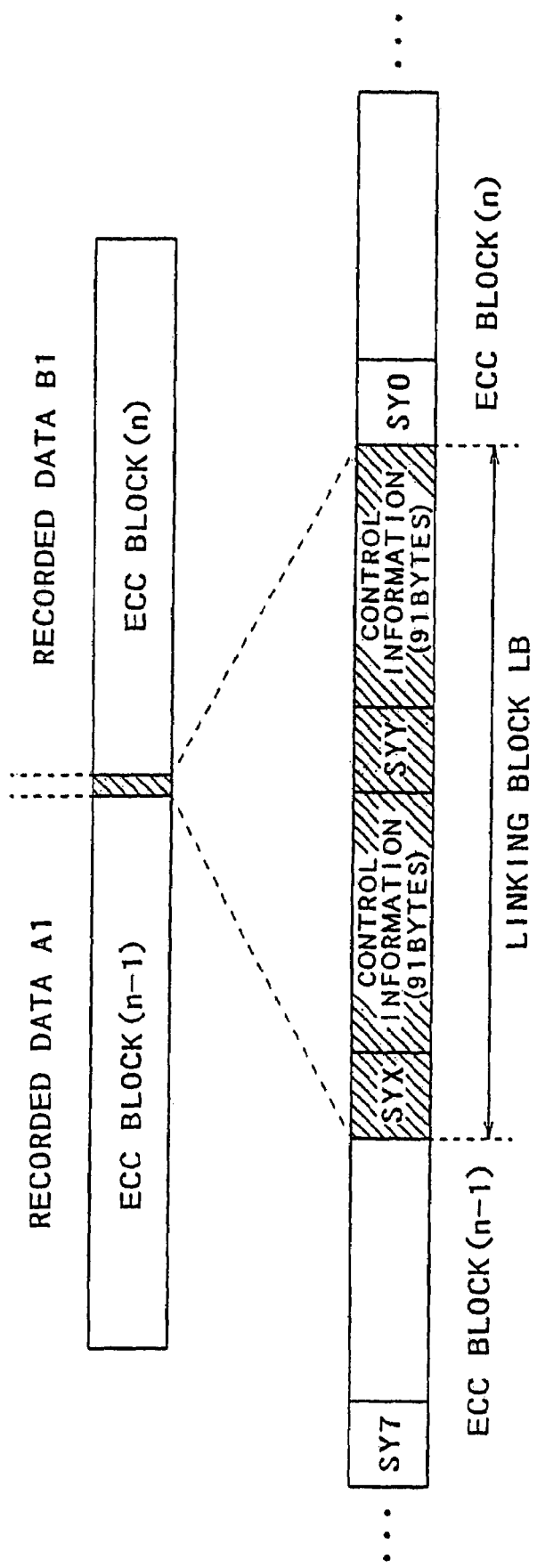
FIG. 13 is a view representing a concrete structure of the linking block applied to the DVD-ROM shown in FIG. 12 according to the second embodiment of the present invention.

Then, the data structure of the linking block LB applied to the DVD-ROM is explained in reference to FIG. 12~FIG. 14.

FIG. 12 is a view representing the data structure of the linking block LB applied to the DVD-ROM. As shown in FIG. 12, the linking block LB, shown in oblique lines, consisting of the two sync frames is inserted on the boundary portion between the ECC block (n−1) and the ECC block (n).

Similarly to the first embodiment, as shown in FIG. 12, a sync code SYX different from the usual sync codes SX0~SX7 is added by the linking block inserting unit 6B to the first sync frame SYF1 in the inserted linking block LB, and a sync code SYY different from the usual sync codes SX0~SX7 is added thereby to the second sync frame SYF in the inserted linking block LB so that referring the sync codes SYX, SYY permits the linking block LB to be distinguished from the actual data portion.

In this structure, on data portions of two sync frames SYF1 and SYF2 included in the linking block LB, control information required for reproduction operations, as shown in FIG. 12, is recorded in place of usual data.

In this configuration, the linking block LB is inserted on all of the boundary portions between all adjacent ECC blocks on the disk 2. According to this configuration, the linking block LB is always inserted between each of the already recorded data and each new additional data when recording each new additional data on the disk 2, and the linking block LB is within three sync frames in size, for example, a little two sync frames in size, as compared with the ECC block including 16×26 sync frames, making it possible to prevent a waste of the recording capacity of the disk 2, thereby making use efficiently of the recording capacity thereof.

The present invention, however, is not limited to the structure of inserting the linking block LB on all boundary portions. That is, the linking block inserting unit 6B may insert the linking block LB on every several boundary portions.

FIG. 13 is a view showing a concrete data configuration of the linking block LB applied to the DVD-ROM as the disk 2. As shown in FIG. 13, the linking block LB consisting of the two sync frames is inserted on the boundary portion between the ECC block (n−1) and the ECC block (n).

When reproducing the DVD-ROM, the data recording unit 7 stops the reproducing proceeding of the record data A1 at the ECC block (n−1) at the last end therein so as to shift to the linking block LB, thereby reading the control information from the linking block LB. When the reading position of the data recording unit 7 reaches to the last end of the linking block LB, the recording unit 7 starts to reproduce the record data B1 from its ECC block (n) at the head end therein.

In the reproducing operations to the DVD-ROM, when detecting the sync code SYX in the linking block LB, the code pattern of sync code SYX is different from that of each of the sync codes SY0~SY7 so that it is possible to easily distinguish the position of the linking block LB. Incidentally, the sync code SYY may be detected in order to distinguish the linking block LB, but, in this embodiment, the sync code SYX is detected so as to distinguish the linking block LB.

Next, the control information recorded on the linking block LB on the DVD-ROM is explained.

The linking block LB consists of two sync frames and each sync frame is 91 bytes in size so that the linking block LB allows a maximum of 182 bytes of the control information to be recorded thereon.

Figure 14A:
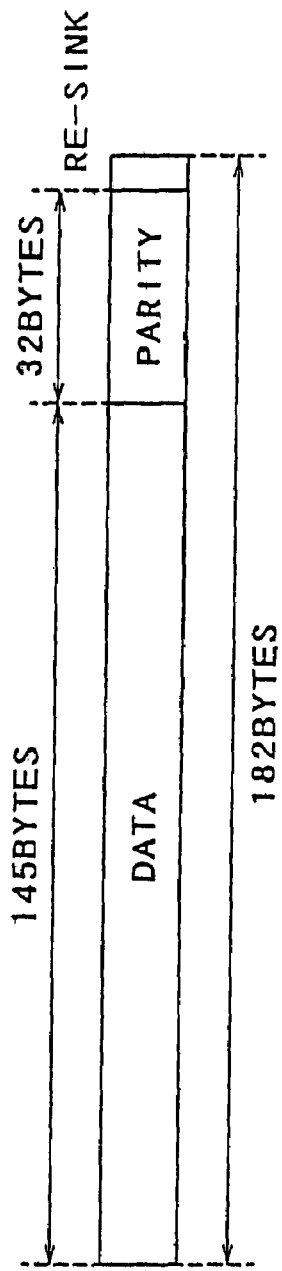
FIG. 14A is a view showing an example of format of control data recorded on the linking block on the DVD-ROM according to the second embodiment of the present invention.
Figure 14B:
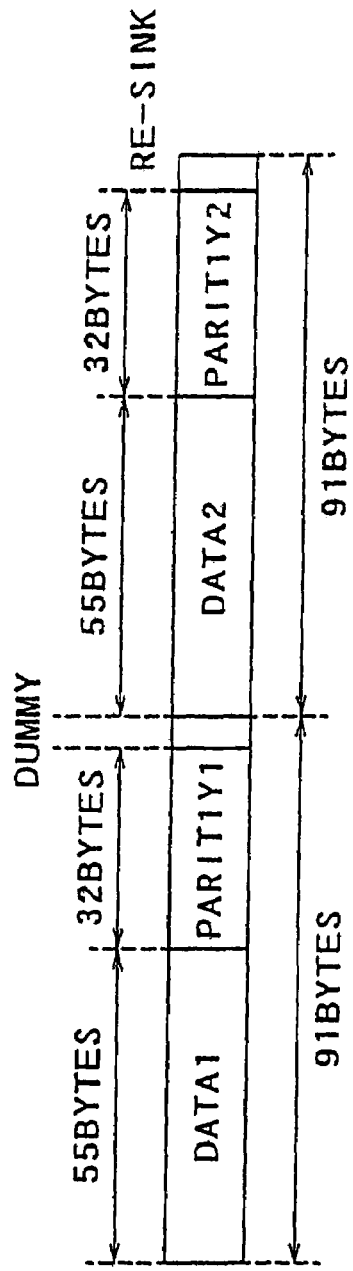
FIG. 14B is a view showing another example of format of control data recorded on the linking block on the DVD-ROM according to the second embodiment of the present invention.

FIG. 14 (FIG. 14A and FIG. 14B) shows different examples of formats of control data recorded on the linking block on the DVD-ROM according to the modification of the second embodiment.

In the format shown in FIG. 14A, the control data comprises control information of 145 bytes in length (in size), parity data of 32 bytes in length, which corresponds to the control information and re-sync data of 5 bytes in length, which represents a last end of the linking block LB. The control information includes, for example, at least one of address of each ECC block, copy protect information, key information (key data) needed to decode the scrambled data or the like.

Then, in this embodiment, because the linking block is formed on all of the boundary portions between the ECC blocks adjacent to each other, it is possible to record the control information so as to correspond to each of the ECC blocks, permitting various kinds of copy protection methods to be applied to each ECC block. As one example of copy protection methods, setting different items of copy information as the control information, each of which corresponds to each of the ECC blocks, makes prevent the record data on a selected particular area from being copied. In addition, the items of control information are set to correspond to the respective ECC blocks so that copy protection methods determined by the items of control information can be changed according to the recording areas to which the ECC blocks are recorded, respectively.

Setting different scramble keys to the ECC blocks, respectively, can make hard the decoding of the scrambled data in the ECC blocks, thereby improving the performance of the scramble processing and making effective prevention of illegal copies.

In the format shown in FIG. 14B, the control data comprises control information of 55 bytes in length (in size) and parity data of 32 bytes in length which are recorded on the areas each of that has 91 bytes in size and that corresponds to each of the sink frames SYF1 and SYF2 of the linking block LB. The control data also comprises dummy data and re-sync data each of which is recorded on a last location of each of the two sink frames SYF1 and SYF2. In the format shown in FIG. 14B, the content of control information is substantially the same as that of control information of the format shown in FIG. 14A. In addition, in the format shown in FIG. 14B, repeatedly recording the same control data two times on the linking block LB allows the reliability of the control data to be improved.

An information reproducing apparatus for reproducing the DVD-ROM related to the modification comprises an information reproducing apparatus including elements which are the same as the optical pickup 3, the reproduction signal production unit 11, the binary slicing unit 12, the PLL 14, the hold signal generating unit 15, the data reading unit 16, the CPU 20 and the memory 21 so that the information reproducing apparatus can detect the linking block LB as described above.

However, in cases of reading the control data from the linking block LB, in order to reproduce the control data on the linking block LB when reproducing the DVD-ROM, the control data on the linking block is reproduced without using the hold signal from the hold signal generating unit 15.

As described above, according to the information recording/reproducing apparatus 1A/1B of the second embodiment, forming the linking block on the boundary portion between the adjacent ECC blocks on the recordable/re-recordable DVD-RW/DVD-R corresponding to the DVD format, or the reproduction-only DVD-ROM permits the compatibility of their recording formats to be secured. In addition, the sync code SYX having a special pattern is added to the linking block.

This configuration allows the linking block not to be formed in each ECC block, preventing the error-correction performance from being deteriorated, and avoiding that the whole ECC block can not be used for recording data. The use of the data portion as the linking block, which is sufficiently shorter than the ECC block, allows a wasteful capacity in the recording capacity of the disk to be decreased.

In addition, when reproducing the disk, detecting the sync code SYX permits the position of the linking block to be securely identified.

Moreover, the emboss area consisting of the emboss pit line is formed on the linking block on the DVD-RW/DVD-R, and the control data is recorded on the linking block of the DVD-ROM so that, when copying data on the DVD-ROM to the DVD-RW/DVD-R, the position of the control data of the DVD-ROM is overlapped on the emboss area on the DVD-RW/DVD-R, whereby the interference of the emboss pit line to the recording mark makes hard reproduce the control data. For example, in cases where the copy protection information or the key data corresponding to each ECC block is recorded on the linking block on the DVD-ROM, it is impossible to distinct the copy protection information or the key data on the DVD-RW/DVD-R, making increase the effect of the prevention of illegal copy.

Incidentally, in these first and second embodiments, the present invention is applied to the information recording/reproducing apparatus corresponding to the DVD-format, but the present invention is not limited to the application.

That is, the present invention may be applied to an information recording/reproducing apparatus corresponding to recording/reproducing format which allows the linking block to be formed on the disk.

INDUSTRIAL AVAILABILITY

As described above, the present invention allows a linking block with a identification code to be inserted on a boundary portion between adjacent unit blocks on an information recording medium which permits information to be recorded thereon or to be reproduced therefrom so that it is possible to prevent error-correction performance from being deteriorated, thereby improving a reliability of recorded information, and to decrease a wasteful capacity in a recording capacity of the information recording medium, thereby making effectively use of the recording capacity thereof.

In addition, the present invention permits a linking block to be arranged on a boundary portion between adjacent unit blocks on an information recording medium so as to form, in a case where an information recordable/re-recordable medium is used as the information recording medium, an emboss area consisting of emboss pit line on the linking block, or to form, in a case where a reproduction-only information recording medium is used as the information recording medium, control data on the linking block, making it possible to decrease a wasteful capacity in a recording capacity of the information recording medium and to effectively prevent an illegal copy.

While there has been described what is at present considered to be the preferred embodiment and modifications of the present invention, it will be understood that various modifications which are not described yet may be made therein, and it is intended to cover in the appended claims all such modifications as fall within the true spirit and scope of the invention.

The entire disclosures of Japanese Patent Application No. 2000-396207 filed on Dec. 26, 2000 and No. 2001-55586 filed on Feb. 28, 2001 including the specification, claims, drawings and summary are incorporated herein by reference in its entirety.

The invention claimed is:

1. An information recording medium comprising:
unit block areas in which ECC (Error Correction Code) blocks are divided into L pieces of frames to which sync codes are added respectively, and are recorded, each of the ECC blocks being a unit of error-correction with respect to record data, the L being a natural number; and
linking areas, each of which is inserted between adjacent unit blocks, in which M pieces of frames are arranged, the M being a natural number,
wherein sync codes different from those in the unit block areas are added to the M pieces of frames at locations separated respectively by a distance equal in length to a sync-code gap in the unit block areas,
wherein in the unit block areas, N kinds of sync codes are recorded, the N being a natural number less than the L,
wherein in the linking areas, M kinds of sync codes are recorded.

2. The information recording medium according to claim 1, wherein each of the linking areas is inserted on each of the boundary portions between said unit blocks.

3. An information reproducing apparatus for reproducing record data recorded in an information recording medium, the information recording medium comprising:
(i) unit block areas in which ECC (Error Correction Code) blocks are divided into L pieces of frames to which sync codes are added respectively, and are recorded, each of the ECC blocks being a unit of error-correction with respect to record data, the L being a natural number; and
(ii) linking areas, each of which is inserted between adjacent unit blocks, in which M pieces of frames are arranged, the M being a natural number,
wherein sync codes different from those in the unit block areas are added to the M pieces of frames at locations separated respectively by a distance equal in length to a sync-code gap in the unit block areas,
(iii) wherein in the unit block areas, N kinds of sync codes are recorded, the N being a natural number less than the L, and
(iv) wherein in the linking areas, M kinds of sync codes are recorded, and
the information reproducing apparatus comprising:
a sync code detecting device which detects the sync code included in a linking information recorded in the linking area from reproduction data obtained by reproducing the record data; and
a reproducing control device which determines a position of the linking area based on the detected sync code.

4. An information reproducing method for reproducing record data recorded in an information recording medium, the information recording medium comprising:
(i) unit block areas in which ECC (Error Correction Code) blocks are divided into L pieces of frames to which sync codes are added respectively, and are recorded, each of the ECC blocks being a unit of error-correction with respect to record data, the L being a natural number; and
(ii) linking areas, each of which is inserted between adjacent unit blocks, in which M pieces of frames are arranged, the M being a natural number,
wherein sync codes different from those in the unit block areas are added to the M pieces of frames at locations separated respectively by a distance equal in length to a sync-code gap in the unit block areas, (iii) wherein in the unit block areas, N kinds of sync codes are recorded, the N being a natural number less than the L, and (iv) wherein in the linking areas, M kinds of sync codes are recorded, and the information reproducing method comprising the steps of:

detecting the sync code included in a linking information recorded in the linking area from reproduction data obtained by reproducing the record data; and determining a position of the linking area based on the detected sync code.

* * * * *